(12) United States Patent
Shiota et al.

(10) Patent No.: US 11,042,072 B2
(45) Date of Patent: Jun. 22, 2021

(54) LIGHT BEAM DIRECTION CONTROL ELEMENT

(71) Applicant: Tianma Japan, Ltd., Kanagawa (JP)

(72) Inventors: Kunihiro Shiota, Kawasaki (JP); Takumi Usukura, Kawasaki (JP)

(73) Assignee: TIANMA JAPAN, LTD., Kanagawa (JP)

( * ) Notice: Subject to any disclaimer, the term of this patent is extended or adjusted under 35 U.S.C. 154(b) by 188 days.

(21) Appl. No.: 16/275,752

(22) Filed: Feb. 14, 2019

(65) Prior Publication Data

US 2019/0250482 A1 Aug. 15, 2019

(30) Foreign Application Priority Data

Feb. 14, 2018 (JP) .............................. JP2018-024571
Oct. 30, 2018 (JP) .............................. JP2018-204087

(51) Int. Cl.
*G02F 1/1679* (2019.01)
*G02F 1/167* (2019.01)
(Continued)

(52) U.S. Cl.
CPC ............ *G02F 1/1679* (2019.01); *G02F 1/167* (2013.01); *G02F 1/1676* (2019.01); *G02F 1/16755* (2019.01)

(58) Field of Classification Search
CPC .......... G02B 5/00; G02B 5/003; G02B 27/14; G02B 27/42; G02B 27/30; G02B 6/08; G02F 1/167; G02F 1/1679; G02F 1/1676; G02F 1/16755; G02F 1/1677; G02F 1/16756; G02F 1/133524; G02F 1/133345; G02F 1/13439; G02F 1/133512; G02F 1/133602
(Continued)

(56) References Cited

U.S. PATENT DOCUMENTS 7,751,667 B2 7/2010 Daniel et al.
2003/0214695 A1* 11/2003 Abramson ................ G02F 1/15
359/265
(Continued)

FOREIGN PATENT DOCUMENTS

WO 2015122083 A1 3/2017

*Primary Examiner* — Jie Lei
(74) *Attorney, Agent, or Firm* — Nixon & Vanderhye (57) ABSTRACT

A light beam direction control element includes: a first transparent substrate; a second transparent substrate which is disposed facing the first transparent substrate; light shielding elements which are disposed between the first transparent substrate and the second transparent substrate; light transmission regions which are disposed between the first transparent substrate and the second transparent substrate and whose sidewalls are surrounded by any of the light shielding elements; a resin layer which is disposed between the first transparent substrate and the second transparent substrate, surrounds an outer circumference of a light transmission region pattern formed by the light transmission regions, and includes a sealed first opening unit; and a first buffer region which is sandwiched between a surface including the first opening unit of the resin layer and the light transmission region pattern, and in which the light shielding elements are injected.

10 Claims, 9 Drawing Sheets

(51) Int. Cl.
  *G02F 1/1676*   (2019.01)
  *G02F 1/16755*  (2019.01)
(58) Field of Classification Search
  USPC ........... 359/228, 290–296, 641, 443; 345/48,
  345/73–76, 107, 184
  See application file for complete search history.

(56)            References Cited

U.S. PATENT DOCUMENTS

2006/0152474 A1*  7/2006  Saito ................... G02F 1/1506
                                                    345/107
2017/0010516 A1   1/2017  Shiota

* cited by examiner

LIGHT BEAM DIRECTION CONTROL ELEMENT

CROSS-REFERENCE TO RELATED APPLICATION

This Non-provisional application claims priority under 35 U.S.C. § 119(a) on Patent Applications No. 2018-024571 filed in Japan on Feb. 14, 2018 and Patent Applications No. 2018-204087 filed in Japan on Oct. 30, 2018, the entire contents of which are hereby incorporated by reference.

BACKGROUND

The present disclosure relates to a light beam direction control element.

In recent years, a viewing angle control device is used to make display contents of smartphones, ATMs and airplane entertainment displays invisible for people other than users. In such a viewing angle control device, a light shielding pattern for controlling a viewing angle is formed, and a light shielding material (e.g., electrophoretic particles or a black ink) is injected in the light shielding pattern (see the specification of U.S. Pat. No. 7,751,667).

SUMMARY OF INVENTION

It is desired to increase a speed of injection of the light shielding material during manufacturing of the viewing angle control device.

In order to solve the above problem, an aspect of the present disclosure, adopt the following structures. A light beam direction control element includes: a first transparent substrate; a second transparent substrate which is disposed facing the first transparent substrate; a plurality of light shielding elements which are disposed between the first transparent substrate and the second transparent substrate; a plurality of light transmission regions which are disposed between the first transparent substrate and the second transparent substrate and whose sidewalls are surrounded by any of the plurality of light shielding elements; a resin layer which is disposed between the first transparent substrate and the second transparent substrate, surrounds an outer circumference of a light transmission region pattern formed by the plurality of light transmission regions, and includes a sealed first opening unit; and a first buffer region which is sandwiched between a surface including the first opening unit of the resin layer and the light transmission region pattern, and in which the light shielding elements are injected.

It is to be understood that both the foregoing general description and the following detailed description are exemplary and explanatory and are not restrictive of this disclosure.

BRIEF DESCRIPTION OF THE DRAWINGS

The present disclosure can be appreciated by the description which follows in conjunction with the following figures, wherein.

EMBODIMENTS

Hereinafter, embodiments are described with reference to the accompanying drawings. It should be noted that the embodiments are merely examples to implement this disclosure and are not to limit the technical scope of this disclosure. Elements common to the drawings are denoted by the same reference signs. Elements in the drawings may not be consistent with the actual size or proportion.

Embodiment 1

Figure 1:
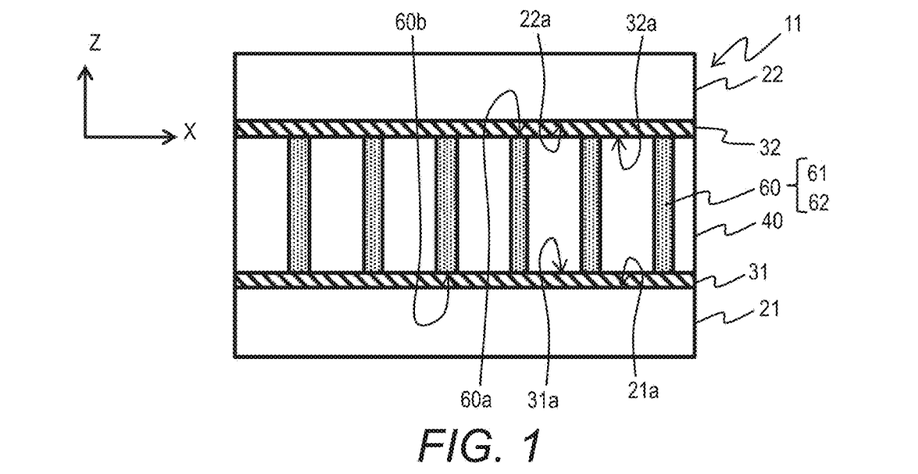
FIG. 1 is a cross-sectional view illustrating one example of a light beam direction control element of a narrow viewing field mode (narrow viewing field state) according to Embodiment 1.
Figure 2:
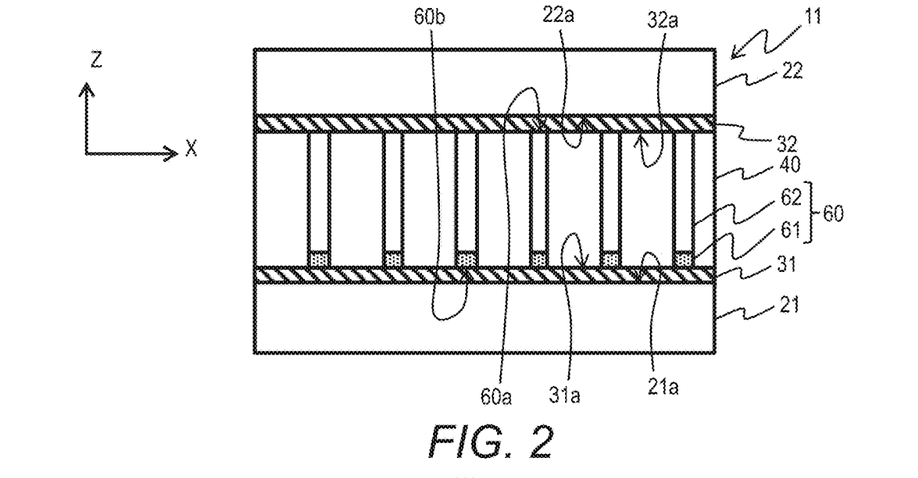
FIG. 2 is a cross-sectional view illustrating one example of the light beam direction control element of a wide viewing field mode (wide viewing field state) according to Embodiment 1.

FIG. 1 is a cross-sectional view illustrating one example of a light beam direction control element of a narrow viewing field mode (narrow viewing field state). FIG. 2 is a cross-sectional view illustrating one example of the light beam direction control element of a wide viewing field mode (wide viewing field state).

A light beam direction control element 11 includes a first transparent substrate 21, a transparent conductive film 31, light transmission regions 40, electrophoretic elements 60, a second transparent substrate 22 and a transparent conductive film 32. The transparent conductive film 31 is formed on a surface (principal surface) 21a of the first transparent substrate 21. The transparent conductive film 32 is formed on a surface (principal surface) 22a of the second transparent substrate 22. The first transparent substrate 21 and the second transparent substrate 22 are disposed such that a principal surface 31a of the transparent conductive film 31 and a principal surface 32a of the transparent conductive film 32 face each other.

In the present disclosure, a direction perpendicular to principal surfaces of a display panel 5 and the light beam direction control element 11 will be referred to as a Z axis direction, and two directions perpendicular in the principal surfaces will be referred to as an X axis direction and a Y axis direction. The Z axis direction is a lamination direction of the transparent substrate and the transparent conductive film.

The electrophoretic elements 60 are sandwiched and disposed between the principal surface 31a of the transparent conductive film 31 and the principal surface 32a of the transparent conductive film 32. The electrophoretic elements 60 include electrophoretic particles 61 (colored) and a dispersion medium 62. Furthermore, in examples in FIGS. 1 and 2, entire upper surfaces 60a of the electrophoretic elements 60 are in contact with the transparent conductive film 32, and entire lower surfaces 60b of the electrophoretic elements 60 are in contact with the transparent conductive film 31.

The light transmission regions 40 and the electrophoretic elements 60 are alternately disposed (without overlapping each other) on the principal surface 31a of the transparent conductive film 31. Similarly, the light transmission regions 40 and the electrophoretic elements 60 are alternately disposed (without overlapping each other) on the principal surface 32a of the transparent conductive film 32.

In addition, each cross section of the light transmission regions 40 and the dispersion medium 62 is illustrated without a hatching for ease of illustration. The light transmission regions 40 are disposed in gaps between the transparent conductive film 31 and the transparent conductive film 32.

In addition, the narrow viewing field mode illustrated in FIG. 1 is realized by dispersing in the dispersion medium 62 the electrophoretic particles 61 in the electrophoretic element 60 disposed in each gap between the light transmission regions 40. Thus, a light beam transmitting from a lower side to an upper side in FIG. 1 is restricted from widening by the electrophoretic elements 60 between the first transparent substrate 21 and the second transparent substrate 22. As a result, when compared before and after the transmission, the viewing angle narrows, so that the narrow viewing field mode is achieved.

By contrast with this, the wide viewing field mode illustrated in FIG. 2 is realized by concentrating the electrophoretic particles 61 near the transparent conductive film 31. For example, a relative potential of the transparent conductive film 31 with respect to the transparent conductive film 32 is made to be the polarity inverse to surface charges of the electrophoretic particles 61, so that the electrophoretic particles 61 are collected near the transparent conductive film 31. Thus, the light beam transmitting from the lower side to the upper side in FIG. 1 is not restricted from widening by the electrophoretic particles 61 between the first transparent substrate 21 and the second transparent substrate 22. As a result, when compared before and after transmission, there is little difference in the viewing angle, so that the wide viewing field mode is achieved.

That is, when the surface charge of the electrophoretic particle 61 is a negative charge (−), the transparent conductive film 31 is made to be an anode. Furthermore, when the surface charge of the electrophoretic particle 61 is a positive charge (+), the transparent conductive film 31 is made to be a cathode.

Subsequently, configuration contents in a case where the surface charge of the electrophoretic particle 61 is the negative charge (−) will be described. Even in a case where the surface charge of the electrophoretic particle 61 is the positive charge (+) can be supported likewise by making the polarity of the transparent conductive film inverse.

The transparent conductive film 31 is disposed to cover the principal surface 21a of the first transparent substrate 21. Similarly, the transparent conductive film 32 is disposed to cover the principal surface 22a of the second transparent substrate 22. In this regard, opening units may be formed at portions of the transparent conductive film 31 and the transparent conductive film 32 which are not in contact with the electrophoretic elements 60. That is, in this case, the light transmission regions 40 are disposed in the opening units. Furthermore, the principal surface 21a of the first transparent substrate 21 and the light transmission regions 40 are in contact in the opening units of the transparent conductive film 31, and the principal surface 22a of the second transparent substrate 22 and the light transmission regions 40 are in contact in the opening units of the transparent conductive film 32.

Next, configuration contents of the light beam direction control element 11 will be described in more detail with reference to FIG. 1. The first transparent substrate 21 is made from, for example, a glass substrate, PET (Poly Ethylene Terephthalate), PC (Poly Carbonate), PEN (Poly Ethylene Naphthalate) or COT (Cyclo Olefin Polymer). The same applies to the second transparent substrate 22, too.

The film thickness of the transparent conductive film 31 is suitably in a range of 10 [nm] to 1000 [nm], and is 50 [nm] in the present embodiment. Furthermore, a constituent material of the transparent conductive film 31 can adopt ITO (Indium Tin Oxide), ZnO, IGZO (Indium Gallium Zinc Oxide) or a conductive nanowire, and adopts ITO in the present embodiment. The same applies to the transparent conductive film 32, too.

The height of the light transmission regions 40 is suitably in a range of 3 [μm] to 300 [μm], and is 60 [μm] in the present embodiment. Furthermore, the width of the light transmission regions 40 (light transmission pattern width) is suitably in a range of 1 [μm] to 150 [μm], and is 20 [μm] in the present embodiment. Furthermore, the width between the light transmission regions 40 is suitably in a range of 0.25 [μm] to 40 [μm], and is 5 [μm] in the present embodiment.

The electrophoretic elements 60 which are a mixture of the electrophoretic particles 61 and the dispersion medium 62 are disposed between the light transmission regions 40, as described above.

Next, four examples will be described as arrangement examples of each light transmission region 40 and each electrophoretic element 60 with reference to FIGS. 3 to 6. Each of FIGS. 3 to 6 illustrates one example of a plan view of the light beam direction control element 11. FIGS. 3 to 6 omit illustration of the transparent conductive film 32 and the second transparent substrate 22. Furthermore, FIGS. 3 to 6 omit a resin layer described below, too.

Figure 3:
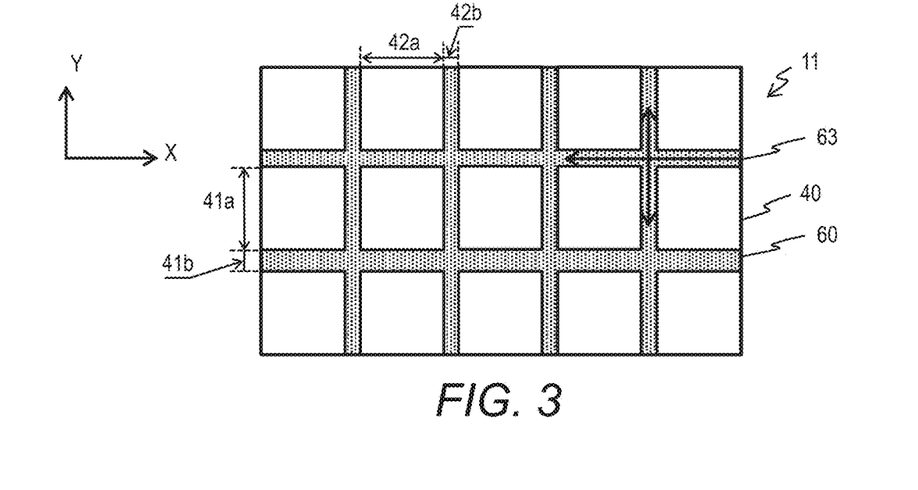
FIG. 3 is one example of a plan view of the light beam direction control element according to Embodiment 1.

An example (first example) of a square pattern structure in FIG. 3 illustrates a planar shape in which the light transmission regions 40 of a square shape are provided in a lattice arrangement. Furthermore, the electrophoretic elements 60 (transparent conductive films 31 and 32) bury the gaps between a plurality of light transmission regions 40. In the first example, in the light beam direction control element 11, a light transmission pattern width 41a and a light transmission pattern width 42a corresponding to the width of each light transmission region 40 are formed to be equal, and a light shielding pattern width 41b and a light shielding pattern width 42b corresponding to the width of the electrophoretic elements 60 (the width between the light transmission regions 40) are also formed to be equal.

Figure 4:
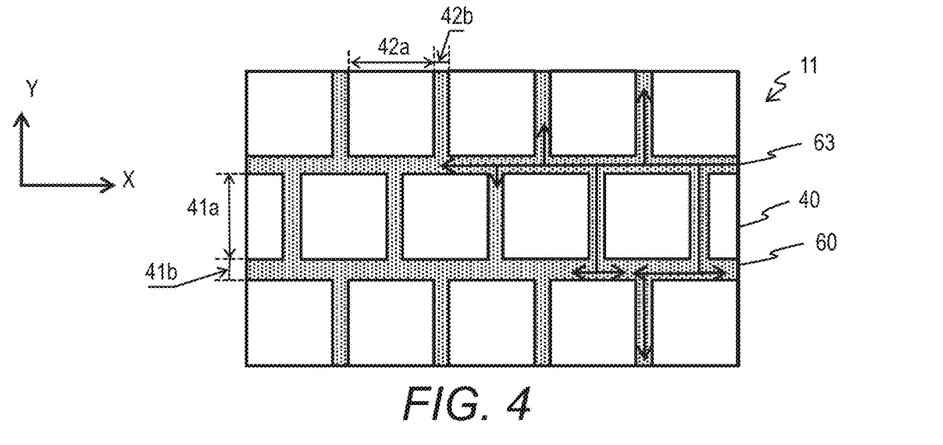
FIG. 4 is one example of a plan view of the light beam direction control element according to Embodiment 1.

An example (second example) of a second square pattern structure in FIG. 4 illustrates a planar shape in which the light transmission regions 40 of the square shape are provided in a zigzag arrangement. Furthermore, the electrophoretic elements 60 (transparent conductive films 31 and 32) bury the gaps between the plurality of light transmission regions 40. In the light beam direction control element 11, the light transmission pattern width 41a and the light transmission pattern width 42a corresponding to the width of each light transmission region 40 are formed to be equal, and the light shielding pattern width 41b and the light shielding pattern width 42b corresponding to the width of the electrophoretic elements 60 (the width between the light transmission regions 40) are also formed to be equal.

Figure 5:
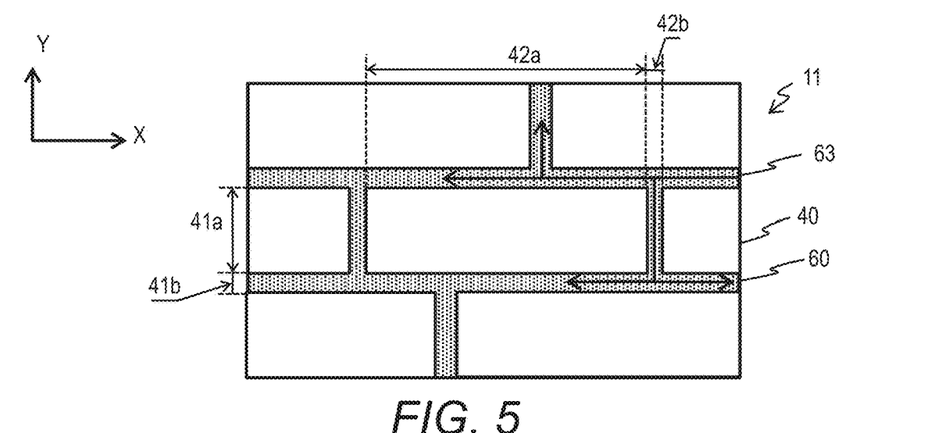
FIG. 5 is one example of a plan view of the light beam direction control element according to Embodiment 1.

An example (third example) of a rectangular pattern structure in FIG. 5 illustrates a planar shape in which the light transmission regions 40 of a rectangular shape are provided in a zigzag arrangement. Furthermore, the electrophoretic elements 60 (transparent conductive films 31 and 32) bury the gaps between the plurality of light transmission regions 40. In the third example, in the light beam direction control element 11, the light transmission pattern width 42a is formed to be longer than the light transmission pattern width 41a. On the other hand, the lengths of the light shielding pattern width 41b and the light shielding pattern width 42b are formed to be equal.

Figure 6:
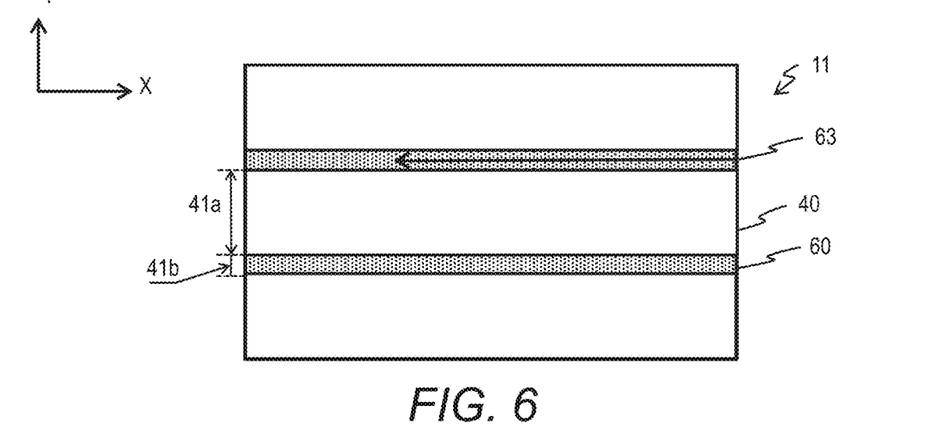
FIG. 6 is a plan view illustrating one example of the light beam direction control element according to Embodiment 1.

An example (fourth example) of a striped pattern structure in FIG. 6 illustrates a striped shape of a planar shape of the light transmission regions 40 and the electrophoretic elements 60 (transparent conductive films 31 and 32). In the fourth example, in the light beam direction control element 11, the light transmission pattern width 41a of each light transmission region 40 and the light shielding pattern width 41b of the electrophoretic elements 60 are disposed to alternately continue. In addition, in a case of the striped pattern, a plurality of transparent conductive films 31 and 32 are electrically connected at an outside which is not illustrated, and are driven.

In this regard, in each case of the first example to the fourth example, in order to realize a high transmittance of the light beam direction control element 11, when the light shielding pattern width 41b is set to 1, a ratio the light transmission pattern width 41a with respect to the light shielding pattern 41b needs to be three times or more (preferably four times or more) (light shielding pattern width 41b/light transmission pattern width $41a \leq \frac{1}{3}$ (preferably $\frac{1}{4}$)). Similarly, when the light shielding pattern width 42b is set to 1, a ratio of the light transmission pattern width 42a with respect to the light shielding pattern 42b needs to be three times or more (preferably four times or more) (i.e., light shielding pattern width 42b/light transmission pattern width $42a \leq \frac{1}{3}$ (preferably $\frac{1}{4}$)).

Although described in detail below, in a manufacturing process of the light beam direction control element 11, the light transmission regions 40 on the first transparent substrate 21 on which the transparent conductive film 31 is laminated are formed first. The second transparent substrate 22 including the transparent conductive film 32 is installed on the surfaces of the light transmission regions 40. Furthermore, the resin layer including an injection hole is formed to cover an outer circumference of a pattern formed by the light transmission regions 40. Lastly, the electrophoretic elements 60 are injected through the injection hole of the resin layer by vacuum injection or injection which uses a capillary phenomenon under an atmospheric pressure. Subsequently, the injection hole is sealed.

In addition, FIGS. 3 to 6 assume a situation that the electrophoretic elements 60 are injected only through the opening units 63 in a state where the electrophoretic elements 60 are not yet injected. Arrows in the light beam direction control element 11 in FIGS. 3 to 6 indicate flows of injection of the electrophoretic elements 60 based on this assumption.

In the example in FIG. 6, the electrophoretic elements 60 cannot be injected in the Y axis direction. Furthermore, in the examples in FIGS. 3 to 5, the ratio of the light transmission pattern width with respect to the light shielding pattern width is three times or more, and therefore an injection rate of the electrophoretic elements 60 in the Y axis direction is slower than an injection rate of the electrophoretic elements 60 in the X axis direction.

Figure 7:
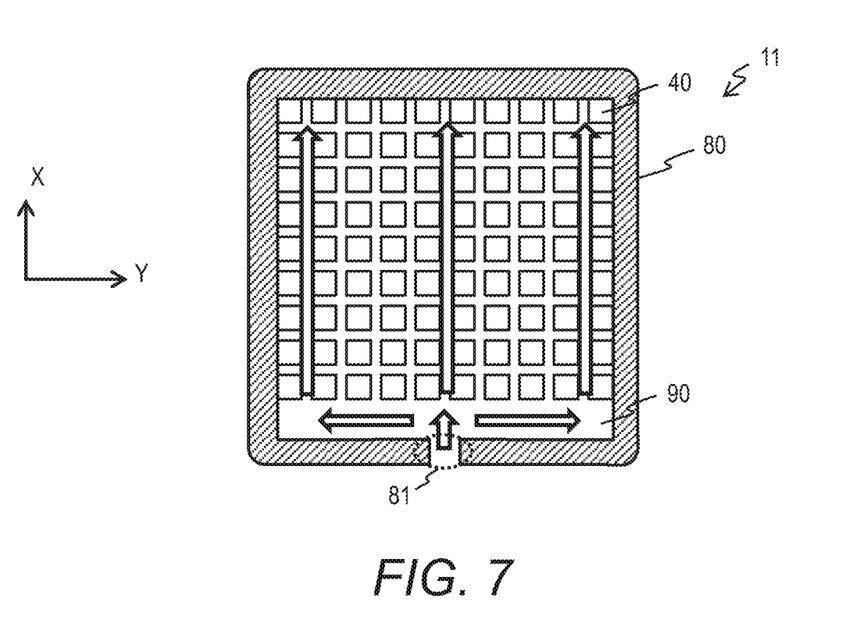
FIG. 7 is a plan view illustrating one example of the light beam direction control element before electrophoretic elements are injected according to Embodiment 1.

A configuration for injecting the electrophoretic elements 60 at a high speed will be described below with reference to FIG. 7. FIG. 7 is a plan view illustrating one example of the light beam direction control element 11 before the electrophoretic elements 60 are injected. FIG. 7 omits illustration of the transparent conductive film 32 and the second transparent substrate 22. Furthermore, in FIG. 7, the pattern of the light transmission regions 40 is the first square pattern (first example), yet may be another pattern (e.g., the above-described second example, third example or fourth example). Furthermore, in FIG. 7, the arrows indicate the flows of the electrophoretic elements 60 in a case where the electrophoretic elements 60 are injected through the injection hole described below. Furthermore, in FIG. 7, a vertical direction is the X axis direction, and a horizontal direction is the Y axis direction. These apply likewise to the other plan views illustrating one example of the light beam direction control element 11 before the electrophoretic elements 60 are injected as described below.

A region in which the electrophoretic elements 60 are injected in the gaps between the light transmission regions 40 in the pattern of the light transmission regions 40 will be also referred to as an electrophoretic element injection region below.

In the example in FIG. 7, the light beam direction control element 11 includes a resin layer 80 which surrounds the outer circumference of the first square pattern formed by the light transmission regions 40. The resin layer 80 includes the injection hole 81 for injecting the electrophoretic elements 60. The width of the injection hole 81 is, for example, approximately 1 to 10 [mm] and is preferably 5 [mm] or less. For example, an epoxy resin can be adopted as a constituent material of the resin layer 80. In addition, a buffer region 90 which is a gap is provided between the surface provided with the injection hole 81 of the resin layer 80 and the first square pattern of the light transmission regions 40. The width in the X axis direction of the buffer region 90 is desirably approximately 10 to 1000 times with respect to the light transmission pattern width 41a and is, for example, approximately 1 to 10 [mm].

When the electrophoretic elements 60 are injected through the injection hole 81, the electrophoretic elements 60 widen in the buffer region 90 in the Y axis direction. Subsequently, the electrophoretic elements 60 widen from a portion of the electrophoretic element injection region which is in contact with the buffer region 90 toward the X axis direction of the electrophoretic element injection region. The buffer region 90 has the sufficiently wider width than the light shielding pattern width, so that the rate at which the electrophoretic elements 60 widen in the Y axis direction in the buffer region 90 is sufficiently higher than a rate at which the electrophoretic elements 60 widen in the Y axis direction in the electrophoretic element injection region.

Hence, compared to a case where there is no buffer region 90 (i.e., the surface including the injection hole 81 of the resin layer 80 is in contact with the first square pattern), the injection rate of the electrophoretic elements 60 in the entire electrophoretic element injection region improves.

In addition, in the example in FIG. 7, the buffer region 90 is in contact with the entire surface including the injection hole 81 of the resin layer 80, yet may be in contact with only part of the surface (in this regard, the buffer region 90 is in contact with the injection hole 81). In this case, the width in the Y axis direction of the buffer region 90 is desirably 10 times or more with respect to the light shielding pattern width. Furthermore, in the example in FIG. 7, the injection hole 81 is formed at a substantially central portion in the Y axis direction, yet may be formed at another position as long as the injection hole 81 is in contact with the buffer region 90.

In addition, when the electrophoretic element injection region and the buffer region 90 are filled with the electrophoretic elements 60, the injection hole 81 is sealed by, for example, the same material as that of the resin layer 80. When the number and widths of the injection holes 81 are increased, the injection rate of the electrophoretic elements 60 increases. However, to prevent occurrence of a failure in a sealing process, the number of the injection holes 81 is desirably small (e.g., one) and the width is desirably 5 [mm] or less as described above.

In addition, the present embodiment has described the light beam direction control element 11 which can switch between the narrow viewing field mode and the wide viewing field mode. However, the light beam direction control element 11 may realize only the narrow viewing field mode. In this case, instead of the electrophoretic elements 60, for example, a black ink is injected as a light shielding material in the light beam direction control element 11. Furthermore, the light beam direction control element 11 may not include the transparent conductive film 31 and the transparent conductive film 32.

Embodiment 2

Figure 8:
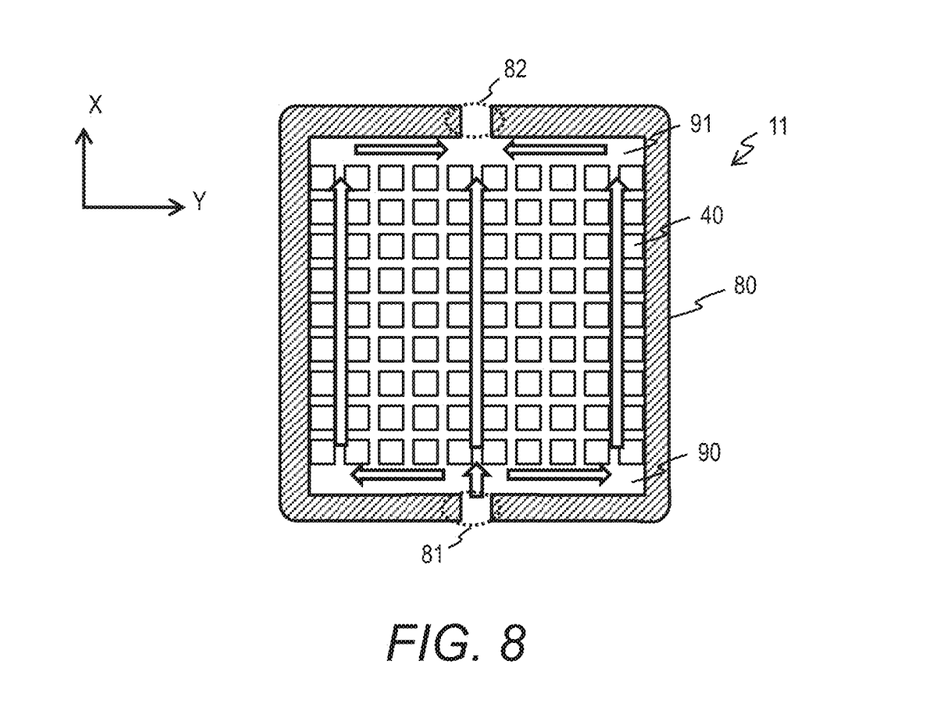
FIG. 8 is a plan view illustrating one example of the light beam direction control element before the electrophoretic elements are injected according to Embodiment 2.

A difference from the first embodiment will be described. FIG. 8 is a plan view illustrating one example of the light beam direction control element 11 before the electrophoretic elements 60 are injected. In the present embodiment, the resin layer 80 includes an exhaust hole 82 on a surface facing the surface including an injection hole 81. Furthermore, a buffer region 91 which is a gap is further provided between the surface provided with the exhaust hole 82 of the resin layer 80, and the first square pattern of the light transmission regions 40. The width in the X axis direction of the buffer region 91 is, for example, approximately 1 to 10 [mm] similar to the buffer region 90.

Thus, even when air remains in the electrophoretic element injection region during injection of the electrophoretic elements 60, the air is exhausted through the exhaust hole 82 via the buffer region 91. Consequently, in the present embodiment, the electrophoretic elements 60 can be uniformly injected in the entire electrophoretic element injection region. In addition, the electrophoretic elements 60 widen in the entire electrophoretic element injection region, and then widen in the entire buffer region 91.

In addition, in the example in FIG. 8, the exhaust hole 82 is formed in the surface facing the surface including the injection hole 81 of the resin layer 80, yet may be formed in another surface other than the surface including the injection hole 81. In this case, the buffer region 91 is provided between the another surface and the first square pattern of the light transmission regions 40. Furthermore, the exhaust hole 82 is formed at a substantially central portion in the Y axis direction, yet may be formed at another position as long as the exhaust hole 82 is in contact with the buffer region 91.

Embodiment 3

Figure 9:
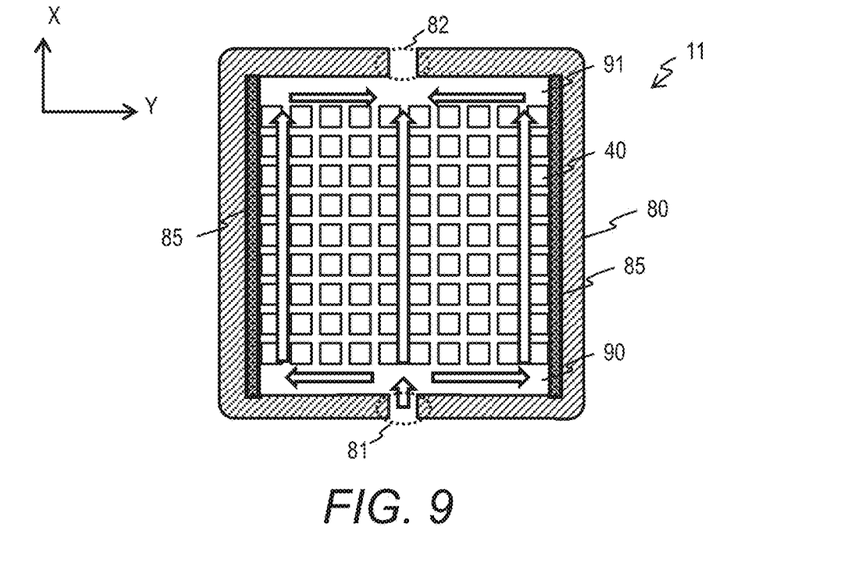
FIG. 9 is a plan view illustrating one example of the light beam direction control element before the electrophoretic elements are injected according to Embodiment 3.

A difference from the second embodiment will be described. FIG. 9 is a plan view illustrating one example of the light beam direction control element 11 before the electrophoretic elements 60 are injected. In the present embodiment, the light beam direction control element 11 includes dams 85 between surfaces which do not include the injection hole 81 and the exhaust hole 82 of the resin layer 80, and the first square pattern of the light transmission regions 40. The widths of the dams 85 are equal to or more than the light transmission pattern width 41a, and preferably five times or more with respect to the light transmission pattern width 41a.

A constituent material of the dams 85 is, for example, a photosensitive resin. The constituent material of the dams 85 may be the same as a constituent material of the light transmission regions 40. The dams 85 can dam the resin of the resin layer 80, and prevent infiltration of the resin in the electrophoretic element injection region, whereby a further slim bezel can be achieved.

Figure 10A:
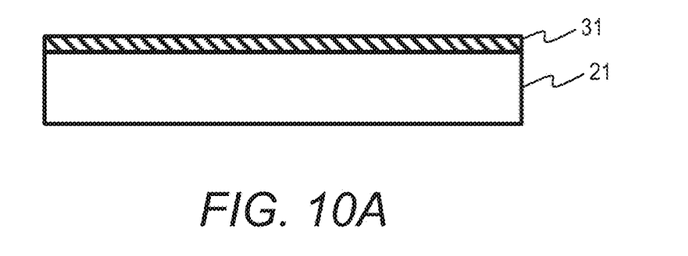
FIG. 10A illustrates one example of a process (transparent conductive film formation process) of a method for manufacturing the light beam direction control element according to Embodiment 3.
Figure 10B:
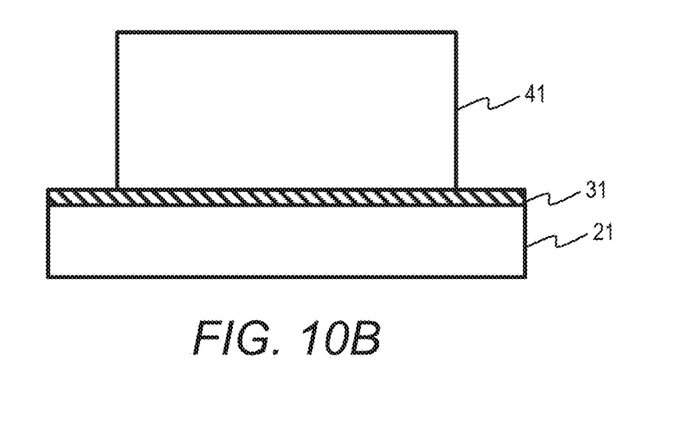
FIG. 10B illustrates one example of a process (photosensitive resin lamination process) of a method for manufacturing the light beam direction control element according to Embodiment 3.

Each process of a method for manufacturing the light beam direction control element 11 according to the present embodiment will be described with reference to FIGS. 10A to 10G. First, as illustrated in FIG. 10A, the transparent conductive film 31 is formed on the surface (principal surface) of the first transparent substrate 21 (transparent conductive film formation process). Next, as illustrated in FIG. 10B, a transparent photosensitive resin layer 41 is laminated and formed as a negative photoresist film on the principal surface side of the first transparent substrate 21 on which the transparent conductive film 31 is formed (photosensitive resin lamination process). In addition, the transparent photosensitive resin layer 41 is a member which becomes the light transmission regions 40 after a transmission region formation process described below.

Figure 10C:
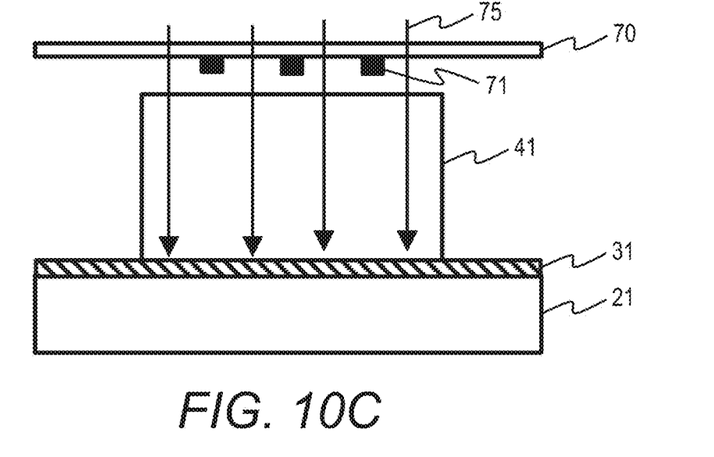
FIG. 10C illustrates one example of a process (exposure light irradiation process) of a method for manufacturing the light beam direction control element according to Embodiment 3.

Next, as illustrated in FIG. 10C, the transparent photosensitive resin layer 41 is irradiated with exposure light 75 via a photomask 70 including a mask pattern 71 to expose the transparent photosensitive resin layer 41 (exposure light irradiation process). During this exposure light irradiation process, control is performed to adjust positions of the photomask 70 and the first transparent substrate 21 by using alignment marks (not illustrated) formed on the first transparent substrate 21 and the photomask 70 such that the position of the mask pattern 71 is located in the region in which the electrophoretic elements 60 are injected (position control process).

Figure 10D:
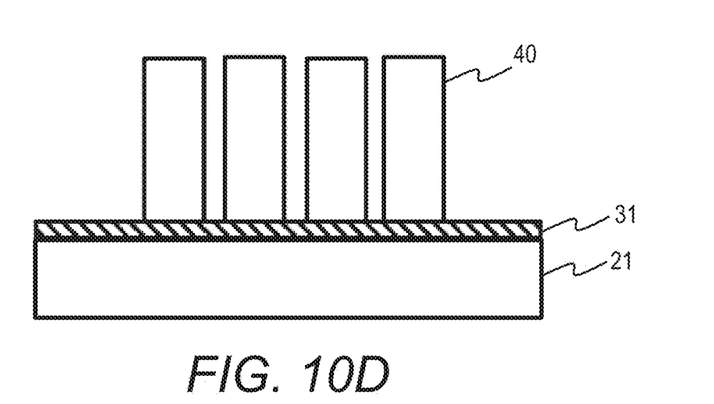
FIG. 10D illustrates one example of a process (transmission region formation process) of a method for manufacturing the light beam direction control element according to Embodiment 3.

Next, development processing is performed on the exposed transparent photosensitive resin layer 41 to form a plurality of light transmission regions 40 which are apart from each other as illustrated in FIG. 10D (transmission region formation process).

Figure 10E:
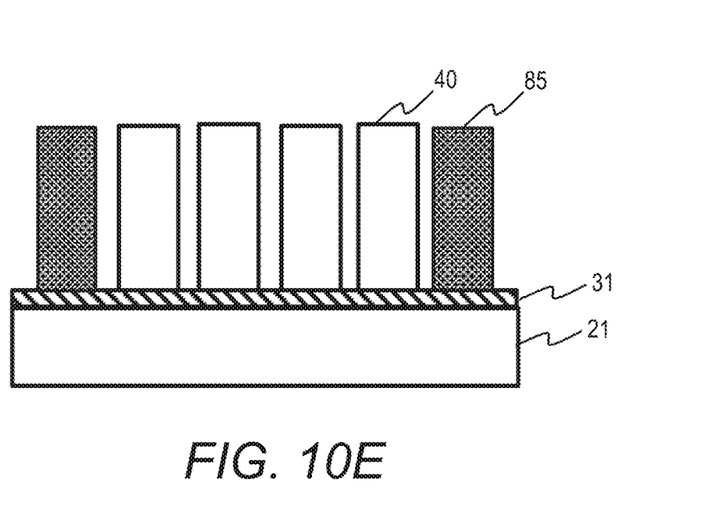
FIG. 10E illustrates one example of a process (dam formation process) of a method for manufacturing the light beam direction control element according to Embodiment 3.

Subsequently, as illustrated in FIG. 10E, the dams 85 are formed on the first transparent substrate 21 and on the outer sides of the light transmission regions 40. In addition, when the constituent material of the dams 85 is the same as the constituent material of the light transmission regions 40, the light transmission regions 40 and the dams 85 may be simultaneously formed by the position control process and the transmission region formation process.

Figure 10F:
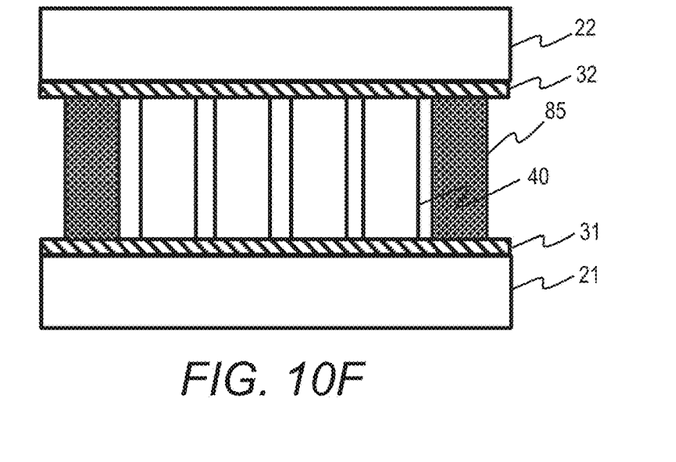
FIG. 10F illustrates one example of a process (transparent substrate installation process) of a method for manufacturing the light beam direction control element according to Embodiment 3.

Next, as illustrated in FIG. 10F, the second transparent substrate 22 including the transparent conductive film 32 is installed on the surfaces of the light transmission regions 40 (transparent substrate installation process).

Figure 10G:
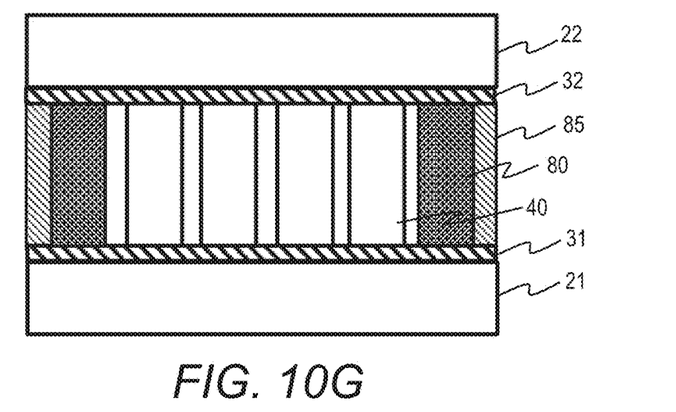
FIG. 10G illustrates one example of a process (resin layer formation process) of a method for manufacturing the light beam direction control element according to Embodiment 3.

Next, as illustrated in FIG. 10G, buffer regions (the buffer region 90 and the buffer region 91 in the present embodiment) are secured, and the resin layer 80 is formed along the outer circumferences of the dams 85 (resin layer formation process). In this case, in the present embodiment, the resin layer 80 is not formed at portions corresponding to the injection hole 81 and the exhaust hole 82.

Figure 10H:
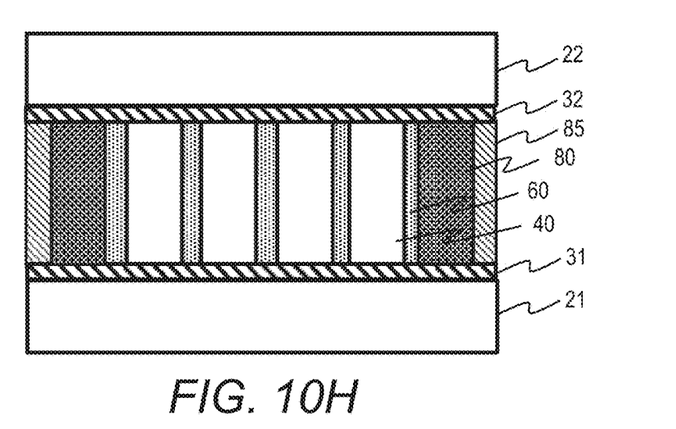
FIG. 10H illustrates one example of a process (electrophoretic element filling process) of a method for manufacturing the light beam direction control element according to Embodiment 3.

Furthermore, as illustrated in FIG. 10H, the electrophoretic elements 60 are filled in gaps formed by the transparent conductive film 31, the light transmission regions 40 and the transparent conductive film 32 (electrophoretic element filling process).

A method for executing the electrophoretic element filling process subsequently to the transparent substrate installation process has been described above with reference to these FIGS. 10A to 10G. However, the light beam direction control element 11 can be manufactured likewise even when the order of these two processes is reversed.

That is, after the processes are performed in the same way as described with reference to FIGS. 10A to 10E, the electrophoretic element filling process of filling the electrophoretic elements 60 between the light transmission regions 40 is executed prior to the transparent substrate installation process, and then the transparent substrate installation process of installing the second transparent substrate 22 including the transparent conductive film 32 on the surfaces of the light transmission regions 40 and the electrophoretic elements 60 may be performed.

Furthermore, a method for forming the resin layer 80 after installing the second transparent substrate 22 has been described. However, the light beam direction control element 11 can be manufactured likewise even when the order of these two processes is reversed.

Figure 15A:
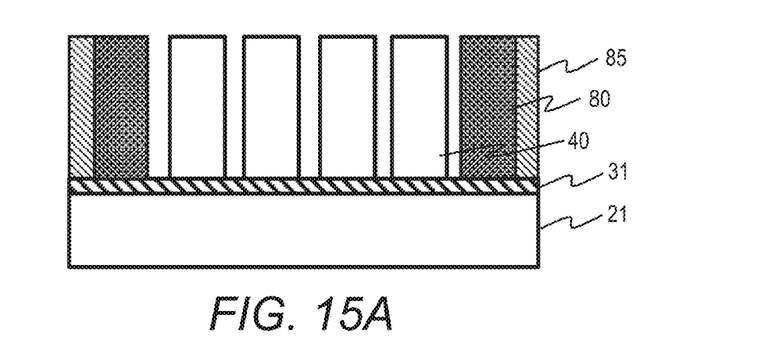
FIG. 15A illustrates one example of a process (resin layer formation process) of a method for manufacturing the light beam direction control element according to Embodiment 3.
Figure 15B:
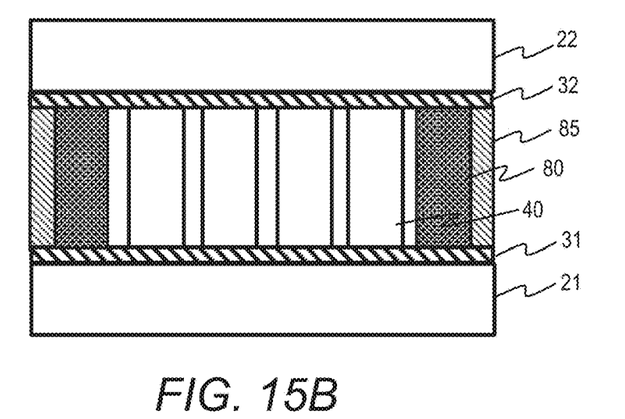
FIG. 15B illustrates one example of a process (transparent substrate installation process) of a method for manufacturing the light beam direction control element according to Embodiment 3.
Figure 15C:
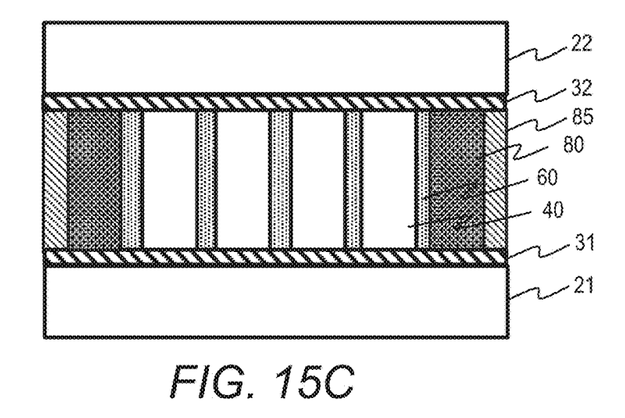
FIG. 15C illustrates one example of a process (electrophoretic element filling process) of a method for manufacturing the light beam direction control element according to Embodiment 3.

That is, after the processes in FIGS. 10A to 10E are performed, the resin layer formation process of forming the resin layer 80 on the outer sides of the dams 85 is executed prior to the transparent substrate installation process as illustrated in FIG. 15A. Subsequently, as illustrated in FIG. 15B, the transparent substrate installation process of installing the second transparent substrate 22 including the transparent conductive film 32 on the surfaces of the light transmission regions 40, the dams 85 and the resin layer 80 is executed. Subsequently, as illustrated in FIG. 15C, the electrophoretic element filling process of filling the electrophoretic elements 60 in the gaps formed by the transparent conductive film 31, the light transmission regions 40 and the transparent conductive film 32 may be executed.

In this regard, the exposure light 75 used for the above-described exposure is parallel light with respect to the lamination direction (a direction in which the transparent photosensitive resin layer 41 is laminated). Furthermore, a UV light source is used as a light source of this exposure light 75, and in the above-described exposure light irradiation process according to the present embodiment UV light of 365 [nm] wavelength, for example, is irradiated as the exposure light 75.

An exposure amount during this irradiation is suitably in a range of 100 [mJ/cm2] to 1000 [mJ/cm2] and the exposure amount of the exposure light 75 is 200 [mJ/cm2] in the present embodiment.

In addition, one of film formation methods such as a slit die coater, a wire coater, an applicator, dry film transfer, spray coating or screen printing can be used as a method for forming the transparent photosensitive resin layer 41 in the exposure light irradiation process. According to this film formation method, the thickness of the transparent photosensitive resin layer 41 which is valid in the range of 30 [μm] to 300 [μm] is formed to become 60 [μm].

Furthermore, a chemically amplified photoresist (product name "SU-8") from Microchem can be adopted as the transparent photosensitive resin used for the transparent photosensitive resin 41. Features of this transparent photosensitive resin are as follows.

The first feature is an epoxy (more specifically, glycidyl ether derivatives of bisphenol A novolac) negative resist which makes a photoinitiator produce an acid when irradiated with an ultraviolet ray and polymerizes curable monomers by using this proton acid as a catalyst. The second feature is that a visible light region has very high transparency.

The third feature is that the curable monomers included in the transparent photosensitive resin have a relatively low molecular weight before curing, and therefore dissolve very well in a solvent such as cyclopentanone, propylene glycol methyl ether acetate (PGMEA), γ-Butyrolactone (GBL) and methyl isobutyl ketone (MIBK), therefore making it easy to form a thick film.

The fourth feature is that light transmittance is very good at a wavelength of a near ultraviolet range, therefore allowing transmission of ultraviolet rays even in a case of the thick film. The fifth feature is that there is each of the above-described features, and consequently it is possible to form a high aspect ratio pattern of whose aspect ratio is 3 or more. The sixth feature is that the curable monomers include multiple functional groups, and therefore achieve very highly dense crosslinking after curing and are very thermally and chemically stable. Therefore, it is easy to perform machining, too, after pattern formation.

In the first place, the present embodiment employs the above-described chemically amplified photoresist as the transparent photosensitive resin layer 41, yet the present embodiment is not limited to this. That is, any photocurable materials may be used as long as the photocurable materials have the same property.

In addition, in the transmission region formation process in FIG. 10D, after exposure, development processing is performed on the transparent photosensitive resin layer 41. That is, the transparent photosensitive resin layer 41 is developed and is next thermally annealed (thermal annealing processing) at conditions of 120 to 150 [° C.] and 30 to 60 [minutes], so that a plurality of partitioned light transmission regions 40 are formed on the transparent photosensitive resin layer 41. When, for example, the first transparent substrate 21 is a glass substrate, the conditions are desirably 150 [° C.] and 30 [minutes].

A formed space width (light shielding pattern width) between the light transmission regions 40 is 5 [μm] as described above. Furthermore, the refractive index of the light transmission regions 40 formed by the above-described "SU-8" is 1.5 to 1.6.

In addition, in the transparent substrate installation process in FIG. 10F, the second transparent substrate 22 including the transparent conductive film 32 is disposed on the light transmission regions 40. This second transparent substrate 22 is fixed to an outer circumferential portion of the first transparent substrate 21 by an adhesive (not illustrated). Any one of a thermal curing or UV curing adhesive may be used for the adhesive used for this fixing.

In addition, the method for manufacturing the light beam direction control element 11 according to the first embodiment and the second embodiment is the same as the above-described manufacturing method except that the method does not include a dam formation process. That is, the transparent substrate installation process is executed subsequently to the transmission region formation process. Furthermore, in the resin layer formation process, the resin layer 80 is formed along an outermost circumference of the pattern of the light transmission regions 40.

Embodiment 4

Figure 11:
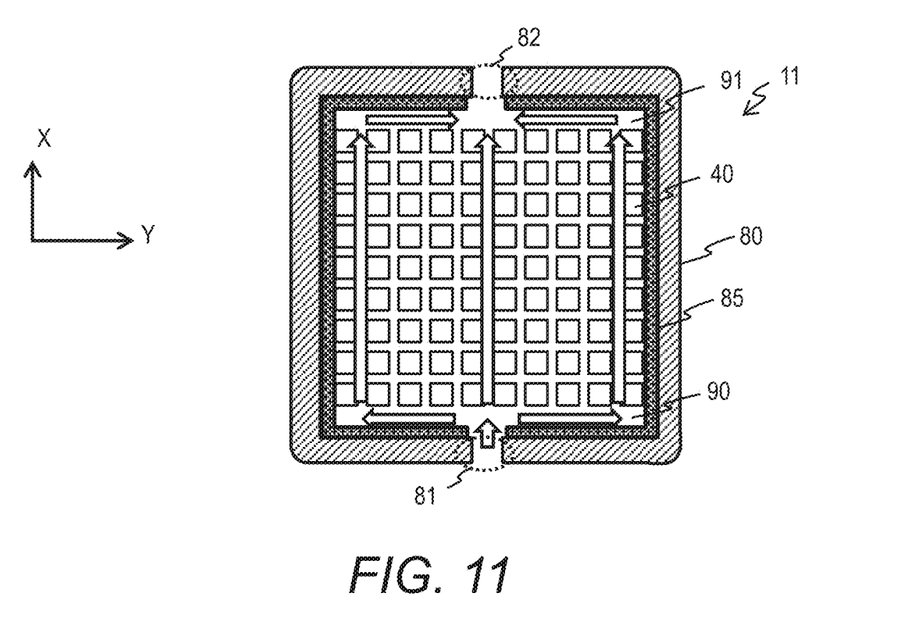
FIG. 11 is a plan view illustrating one example of the light beam direction control element before the electrophoretic elements are injected according to Embodiment 4.

A difference from the third embodiment will be described. FIG. 11 is a plan view illustrating one example of the light beam direction control element 11 before the electrophoretic elements 60 are injected. In the present embodiment, the dams 85 are formed not only between the surfaces which do not include the injection hole 81 and the exhaust hole 82 of the resin layer 80, and the first square pattern of the light transmission regions 40, but also between the surface which includes the injection hole 81 of the resin layer 80 and the buffer region 90 and between the surface which includes the exhaust hole 82 of the resin layer 80 and the buffer region 91.

In addition, the dams 85 are provided with opening units so as not to block the injection hole 81 and the exhaust hole 82. These shapes of the dams 85 enable the light beam direction control element 11 according to the present embodiment to further enhance the slim bezel effect. Furthermore, it is also possible to enhance an injection rate of the electrophoretic elements 60, and narrow the buffer region 90 and the buffer region 91.

Embodiment 5

Figure 12:
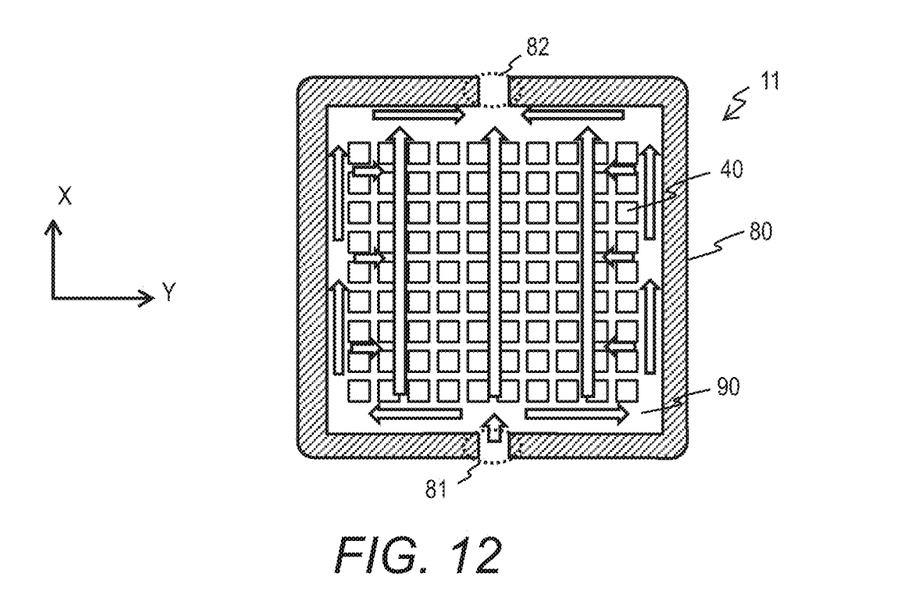
FIG. 12 is a plan view illustrating one example of the light beam direction control element before the electrophoretic elements are injected according to Embodiment 5.

A difference from the second embodiment will be described. FIG. 12 is a plan view illustrating one example of the light beam direction control element 11 before the electrophoretic elements 60 are injected. In the present embodiment, the buffer region 90 is provided between all surfaces of the resin layer 80 and the first square pattern of the light transmission regions 40. The width in the Y axis direction of the portion of the buffer region 90 which is in contact with the surface which does not include the injection hole 81 and the exhaust hole 82 of the resin layer 80 is, for example, approximately 1 to 10 [mm].

When the electrophoretic elements 60 are injected through the injection hole 81, the electrophoretic elements 60 widen toward the Y axis direction at the portion of the buffer region 90 which is in contact with the surface which includes the injection hole 81 of the resin layer 80. Subsequently, the electrophoretic elements 60 widen from the portion of the electrophoretic element injection region which is in contact with the buffer region 90 toward the X axis direction of the electrophoretic element injection region.

Furthermore, the electrophoretic elements 60 widen toward the X axis direction at the portions of the buffer region 90 which are in contact with the surfaces which do not include the injection hole 81 and the exhaust hole 82 of the resin layer 80. Subsequently, the electrophoretic elements 60 widen from these portions toward the Y axis direction of the electrophoretic element injection region.

This shape of the buffer region 90 enables the light beam direction control element 11 according to the present embodiment to further enhance the injection rate of the electrophoretic elements 60.

Embodiment 6

Figure 13:
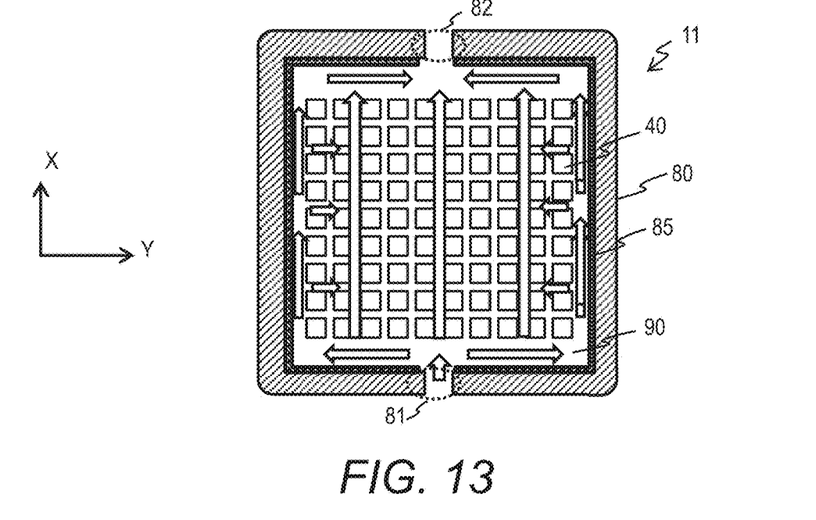
FIG. 13 is a plan view illustrating one example of the light beam direction control element before the electrophoretic elements are injected according to Embodiment 6.

A difference from the fifth embodiment will be described. FIG. 13 is a plan view illustrating one example of the light beam direction control element 11 before the electrophoretic elements 60 are injected. In the present embodiment, the light beam direction control element 11 includes dams 85. The dams 85 are formed between all surfaces of the resin layer 80 and the buffer region 90. In addition, the dams 85 are provided with opening units so as not to block the injection hole 81 and the exhaust hole 82.

The dams 85 are provided in this way, so that the light beam direction control element 11 according to the present embodiment can enhance the injection rate of the electrophoretic elements 60 and prevent infiltration of the resin into the electrophoretic element injection region and can further obtain the slim bezel effect. Furthermore, it is possible to narrow the buffer region 90.

Embodiment 7

Figure 14:
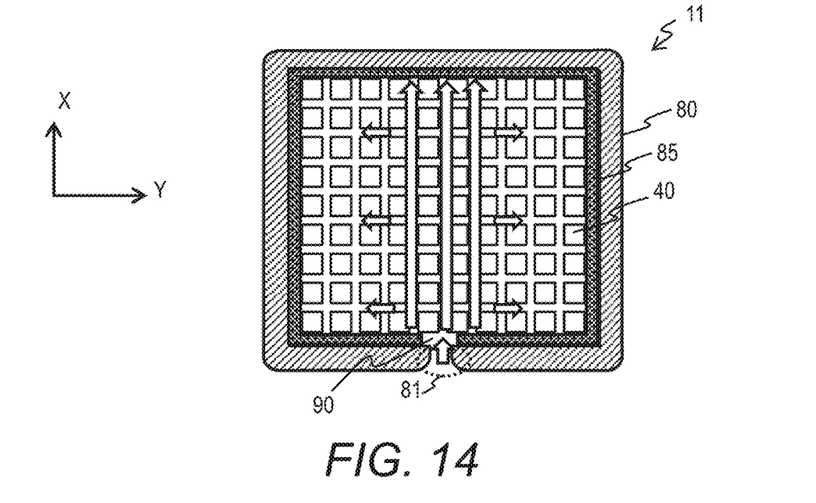
FIG. 14 is a plan view illustrating one example of the light beam direction control element before the electrophoretic elements are injected according to Embodiment 7.

A difference from the first embodiment will be described. FIG. 14 is a plan view illustrating one example of the light beam direction control element 11 before the electrophoretic elements 60 are injected. In the present embodiment, the width in the Y axis direction of the buffer region 90 is wider than the width in the Y axis direction of the injection hole 81, and is narrower than the width in the Y axis direction of the surface which includes the injection hole 81 of the resin layer 80.

Furthermore, in the present embodiment, the light beam direction control element 11 includes the dam 85 which is formed between each surface of the resin layer 80 and the first square pattern of the light transmission regions 40. In this regard, the dam 85 is provided with an opening unit so as not to block the buffer region 90 and the injection hole 81.

The light beam direction control element 11 according to the present embodiment is provided with the buffer region 90, yet has a narrow area of the buffer region 90, so that it is possible to improve the injection rate of the electrophoretic elements 60, increase the region filled with the electrophoretic elements 60, and further realize the slim bezel. Furthermore, the dam 85 can dam the resin from all directions of the resin layer 80, so that it is possible to prevent infiltration of the resin in the electrophoretic element injection region. Furthermore, the dam 85 can realize the slim bezel.

Embodiment 8

Figure 16:
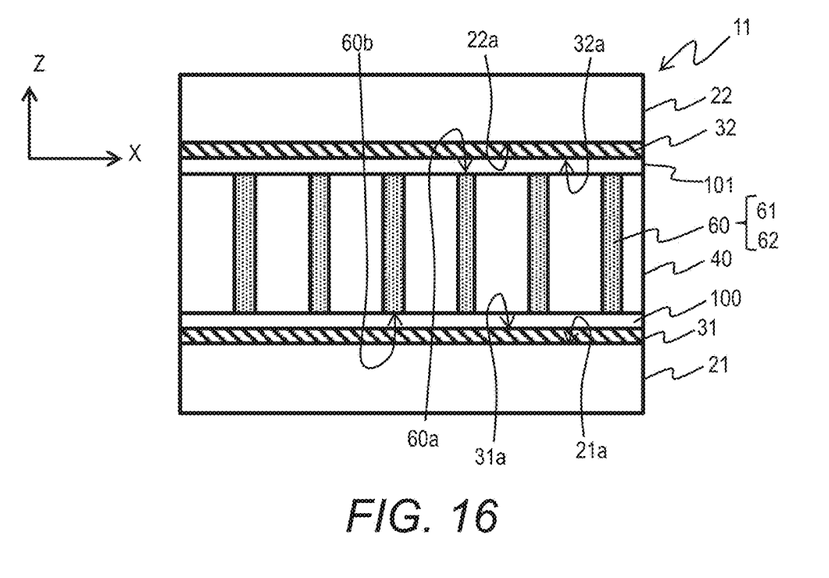
FIG. 16 is a cross-sectional view illustrating one example of a light beam direction control element of a narrow viewing field mode (narrow viewing field state) according to Embodiment 8.

A difference from the first embodiment will be described. FIG. 16 is a cross-sectional view illustrating one example of a light beam direction control element of the narrow viewing field mode (narrow viewing field state). In a light beam direction control element 11 according to the first embodiment, the transparent conductive film 31, the transparent conductive film 32 and electrophoretic elements 60 are in contact. On the other hand, the light beam direction control element 11 according to the present embodiment includes a first transparent protection film 100 and a second transparent protection film 101.

The first transparent protection film 100 is provided between the transparent conductive film 31 and the electrophoretic elements 60. The second transparent protection film 101 is provided between the transparent conductive film 32 and the electrophoretic elements 60. More specifically, for example, the first transparent protection film 100 is disposed to cover the principal surface 31a of the transparent conductive film 31. Furthermore, the second transparent protection film 101 is disposed to cover the principal surface 32a of the transparent conductive film 32.

In addition, the first transparent protection film 100 may not cover the entire principal surface 31a of the transparent conductive film 31, and only needs to be disposed such that the principal surface 31a and the electrophoretic elements 60 are not in contact with each other. More specifically, for example, the first transparent protection film 100 may be a transparent protection film pattern disposed only in a region on a +Z axis direction of the upper surfaces 60a of the electrophoretic elements 60 in the region on the principal surface 31a. Similarly, the second transparent protection film 101 may not cover the entire principal surface 32a of the transparent conductive film 32, and only needs to be disposed such that the principal surface 32a and the electrophoretic elements 60 are not in contact with each other. More specifically, for example, the second transparent protection film 101 may be a transparent protection film pattern disposed only in a region on a −Z axis direction of the lower surfaces 60b of the electrophoretic elements 60 in the region on the principal surface 32a.

As a constituent material of the first transparent protection film 100, SiO2 or Si3N4 can be adopted, and the constituent material is SiO2 in the present embodiment. The same applies to the second transparent protection film 101, too. In the light beam direction control element 11 according to the present embodiment, the transparent conductive film 31 and the transparent conductive film 32 are covered by the first transparent protection film 100 and the second transparent protection film 101 respectively, so that it is possible to obtain an effect that electrophoretic particles 61 do not adhere to the surfaces of the transparent conductive film 31 and the transparent conductive film 32.

The embodiments of the present disclosure have been described above. However, the present disclosure is not limited to the above-described embodiments. One of ordinary skill in the art can easily change, add and convert each element of the above-described embodiments within the scope of the present disclosure. Part of components of one embodiment can be replaced with components of another embodiment, and components of another embodiment can be also added to components of one embodiment.

What is claimed is:

1. A light beam direction control element comprising:
a first transparent substrate;
a second transparent substrate which is disposed facing the first transparent substrate;
a plurality of light shielding elements;
a plurality of light transmission regions which are disposed between the first transparent substrate and the second transparent substrate and having sidewalls surrounded by any of the plurality of light shielding elements, the plurality of light transmission regions forming a light transmission region pattern, each of the light shielding elements being arranged alternately with each of the light transmission regions;
a resin layer which is disposed between the first transparent substrate and the second transparent substrate, the resin layer surrounding an outer circumference of the light transmission region pattern formed by the plurality of light transmission regions, the resin layer including a sealed first opening; and
a first buffer region which is sandwiched between a surface including the first opening of the resin layer and the light transmission region pattern, and in which the light shielding elements are disposed, the light shielding elements being injected in the first buffer region before the first opening is sealed, the first buffer region extending at least over an entire first surface including the first opening or over an entire dam surface of at least one dam when the dam faces the first surface.

2. The light beam direction control element according to claim 1, wherein
the resin layer includes a sealed second opening on a surface different from the surface including the first opening, and
the light beam direction control element further comprises a second buffer region which is sandwiched between the surface including the second opening of the resin layer and the light transmission region pattern, and in which the light shielding elements are disposed.

3. The light beam direction control element according to claim 2, further comprising a first dam of the at least one dam which is sandwiched between a surface of the resin layer, which does not include the first opening and the second opening, and the light transmission region pattern.

4. The light beam direction control element according to claim 3, further comprising:

a second dam of the at least one dam which is sandwiched between the surface including the first opening of the resin layer, and the first buffer region; and a third dam of the at least one dam which is sandwiched between the surface including the second opening of the resin layer, and the second buffer region, wherein the second dam includes a second dam opening which overlaps the first opening, and the third dam includes a third dam opening which overlaps the second opening.

5. The light beam direction control element according to claim 2, further comprising a third buffer region which is sandwiched between a first surface and the light transmission region pattern and in which the light shielding elements are disposed, the first surface being different from the surface including the first opening and the surface including the second opening of the resin layer.

6. The light beam direction control element according to claim 5, further comprising:
a first dam of the at least one dam which is sandwiched between the surface including the first opening of the resin layer, and the first buffer region;
a second dam of the at least one dam which is sandwiched between the surface including the second opening of the resin layer, and the second buffer region; and
a third dam of the at least one dam which is sandwiched between the first surface of the resin layer and the third buffer region.

7. The light beam direction control element according to claim 1, further comprising:
a first dam of the at least one dam which is sandwiched between the surface including the first opening of the resin layer, and the light transmission region pattern; and a second dam of the at least one dam which is sandwiched between a surface different from the surface including the first opening of the resin layer, and the light transmission region.

8. The light beam direction control element according to claim 1, further comprising:
a first electrode which is formed on a first surface of the first transparent substrate facing the second transparent substrate; and
a second electrode which is formed on a second surface of the second transparent substrate facing the first transparent substrate,
wherein each of the plurality of light shielding elements is an electrophoretic element sandwiched between the first electrode and the second electrode, and includes a colored electrophoretic particle, and a dispersion medium,
the light beam direction control element controls a potential of one or more of the first electrode and the second electrode, and controls a dispersion state and a concentration state of the colored electrophoretic particle of the plurality of light shielding elements.

9. The light beam direction control element according to claim 8, further comprising:
a first transparent protection film which is sandwiched between the first electrode and the light shielding elements; and
a second transparent protection film which is sandwiched between the second electrode and the light shielding elements.

10. The light beam direction control element according to claim 1, wherein a pattern width of the light transmission region pattern is three times or more with respect to a pattern width of a light shielding region pattern formed by the plurality of light shielding elements.

* * * * *